United States Patent Office 3,748,103
Patented July 24, 1973

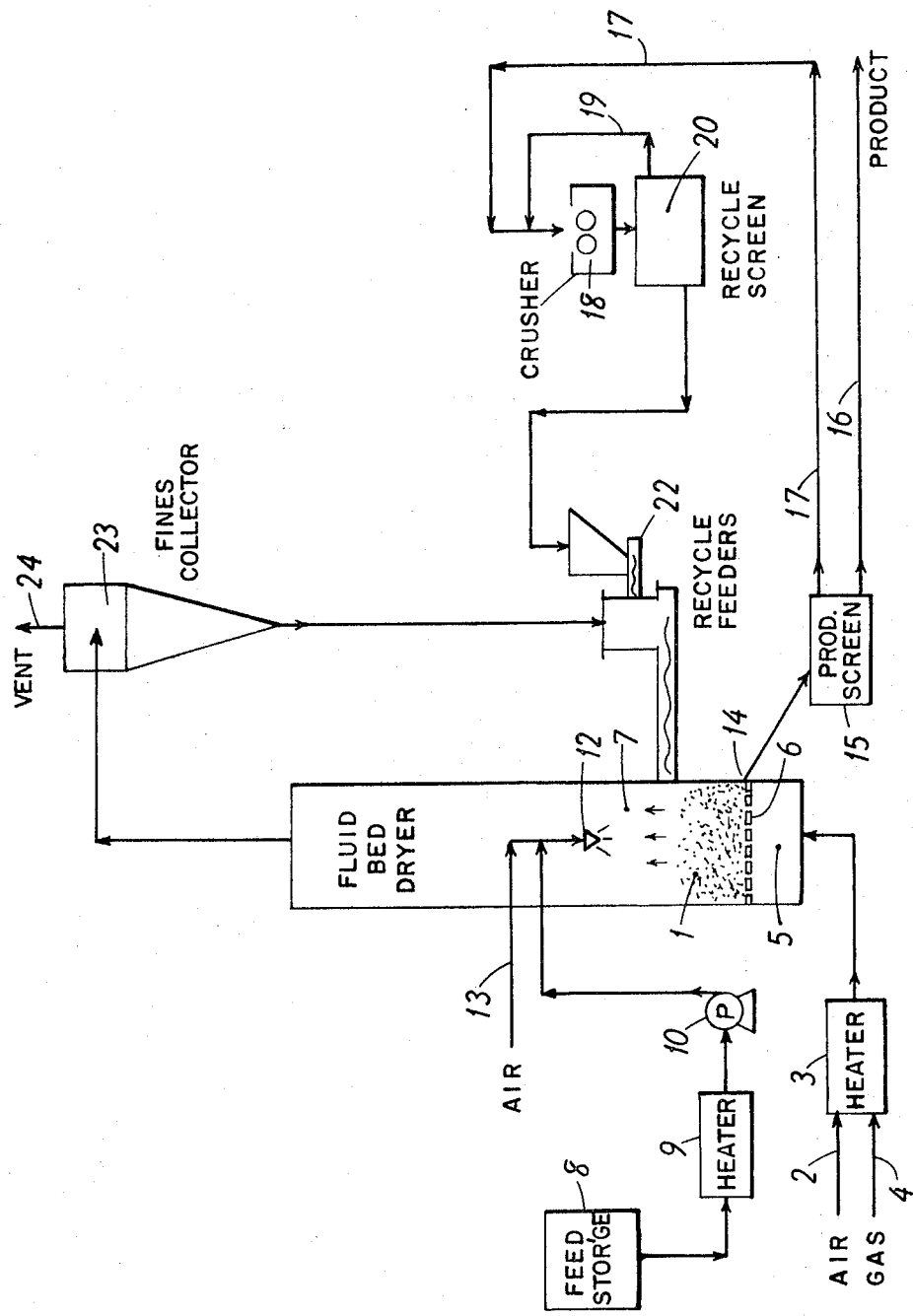
FLOW DIAGRAM – HYDROUS GRANULAR SODIUM SILICATE
INVENTORS
ANTHONY W. MONTONE
SAMUEL L. BEAN
BY 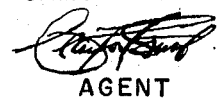
AGENT

3,748,103
PROCESS FOR THE PRODUCTION OF HYDROUS GRANULAR SODIUM SILICATE
Samuel L. Bean, Jamesville, and Anthony W. Montone, Elbridge, N.Y., assignors to Allied Chemical Corporation, New York, N.Y.
Filed June 25, 1971, Ser. No. 156,774
Int. Cl. C01b 33/32
U.S. Cl. 23—313                                15 Claims

ABSTRACT OF THE DISCLOSURE

A granular hydrous sodium silicate product the granules of which comprise agglomerated particles, the $Na_2O/SiO_2$ ratio of said product ranging from 1:1.0 to 1:3.2 with a water content of 10 to 20% by weight is made by a process for the production of said product involving the dispersion of an aqueous solution of sodium silicate into a fluid bed zone, removing a portion of the bed, controlling operating variables to maintain the moisture content of the bed within prescribed limits and recycling a quantity of the material removed.

BACKGROUND OF THE INVENTION

Field of the invention

Sodium silicate has been a product of commerce for many years. It has been used in soap and detergent formulations, and in silica gel production, such gels serving as catalyst supports in many catalytic processes. Sodium silicate solution, commonly known as "water glass," is used as an adhesive and in the formulation of adhesives. It has also long been used as an egg preserver and in the production of finely divided silica, the latter having application as a pigment in paints, as a resinforcing agent in rubber manufacture, and in the compounding of polymeric materials. Furthermore, it has application in the treatment of ore and of paper and also in the manufacture of roofing materials. At the present time the greatest single use of this material is in the production of catalysts and silica gels. The use of sodium silicate in detergent manufacture, however, is growing rapidly and may soon become the major outlet for granular hydrous sodium silicate.

In the past, sodium silicate has been used in the formulation of detergents primarily because its presence tends to keep soil particles from redepositing on the articles from which they have been removed, and because it reduces the corrosive action of the detergent on washing machine parts. Another important reason for its use is based on the fact that it provides a uniform viscosity to the slurry formed in the manufacture of detergents and therefore contributes to an improved spray-dried product. Furthermore, sodium silicate, when employed as an additive in detergent formulations, is known to act as a buffering and anti-caking agent in the finished product.

Recent concern for the effect of phosphates, widely used in present-day detergents, which promote the growth of algae and other unwanted water plants, has naturally brought attention to sodium silicate as an alternative to phosphates. Most mineral deposits found in nature contain silica and since most silicates, with the exception of some of the alkaline earth silicates, are soluble, silicate wastes have susbstantially no unwanted effect on the ecology. It is quite natural, then, that sodium silicate should now receive wide attention as an ingredient in detergent formulations because of the above desirable characteristic.

DESCRIPTION OF THE PRIOR ART

Most of the sodium silicate which is manufactured for detergent formulation has heretofore been prepared by spray drying a dilute solution (40% or less) of sodium silicate, anhydrous basis. The granules so prepared ordinarily are hollow globular particles having an outer coating or concentric coatings of solidified sodium silicate.

Spray dried sodium silicate generally has a very low bulk density, making it bulky to ship and costly to package on a per-pound basis. This has been overcome to some degree by producing a very finely divided product which has a suitable density, but unfortunately is very dusty. This dust, which is objectionably irritating, presents a serious problem during the handling and formulation of detergent products. Furthermore, spray dried particles lack durability, hence the degree of attrition on handling is undesirably high. Perhaps even more disadvantageous is the fact that the particles have a tendency to pick up moisture from the air, and to cake on standing. Still another serious disadvantage of the spray drying process for producing hydrous sodium silicate, is that all material which must be recycled to the process, such as fines or outsized particles must be redissolved in water and re-sprayed, thus adding materially to the heat requirements, and correspondingly, to the cost of the spray dried product.

A desirable product for the detergent industry can be characterized as having an $Na_2O$ to $SiO_2$ molar ratio of between 1:1.8 and 1:2.8, a loose bulk density greater than 18 lbs./ft.$^3$, a moisture content between 13 and 20% and a screen size such that the greater part of the product will pass 60 mesh (Tyler) and remain on a 325 mesh screen. It has been found very difficult, if at all possible, to obtain such material by the techniques of the prior art in one step. It is possible to obtain a product with the proper bulk density by one-step process where the moisture content is in excess of 22.5%, but as previously mentioned, the product so obtained is extremely fine and has a tendency to cake.

SUMMARY OF THE INVENTION

A fluid bed is maintained at a temperature between 150° to 450° F., preferably between 240° and 300° F. The bed comprises granules of hydrous sodium silicate, the $Na_2O/SiO_2$ ratio of which lies within the range of about 1:1.0 to 1:3.2 and which contain about 10 to 20% water on a combined weight basis. Preferably, the bed comprises granules constituted with an $Na_2O/SiO_2$ ratio ranging from 1:1.8 to 1:2.8 and a water content ranging from 14 to 19%.

A feed solution of sodium silicate having the ratio of $Na_2O/SiO_2$ desired in the fluid bed as well as in the final product, preferably 1:1.8 to 1:2.8, is prepared in a concentration of at least about 25% and preferably in a concentration of about 45 to 55%, basis anhydrous sodium silicate. The solution is heated to about 100–300° F., preferably, 150–225° F. and injected into the fluidizing zone. This solution may be dispersed under pressure but preferably it is dispersed into the fluidizing zone or "atomized" by employing a compressed gas, preferably compressed air, at a pressure of about 25–100 p.s.i.g. The bed is fluidized by a preheated gas, preferably air, passing upwardly through the bed and at a sufficiently high temperature to maintain the bed between about 150 to 450° F., preferably between 240 to 300° F. The exiting gas passes through a fines-separator such as a cyclone dust collector, which removes entrained fines. The gas may be exited or at least part may be recycled to the fluid bed. Bed particles are continuously withdrawn and if products having a given range of particle size are required, the withdrawn particles are subjected to screening or other classification means. Outsized particles are crushed. At least a portion of this crushed material may be reclassified and all or part may be returned to the fluid bed to thus provide a means of product control and a means of stabilizing the performance of the fluid bed operation.

In operation, seed particles comprising one or more of the following:

(a) fines collected in the fines-collector;
(b) outsized particles separated from material withdrawn from the bed, then crushed or otherwise comminuted;
(c) part of the material withdrawn from the fluid bed as product;

are recycled to the bed. Within the bed, these seed particles, and any spontaneously formed within the bed, grow by agglomeration as a result of the incoming feed solution and the particular conditions existing within the bed. These seed particles become agglomerates of relatively uniform, fine, crystal-like particles, their size increasing with their retention time in the bed.

It might reasonably be assumed, since the agglomerates of our invention present more surface than a spray dried particle of equivalent volume, that they would absorb more moisture on standing, and that this granular product would cake. Furthermore, since each granule or agglomerate is comprised of several smaller irregularly shaped particles, it might be assumed that these agglomerates would be more fragile than the hollow globular particles commonly obtained from spray drying techniques. Surprisingly, we find quite the opposite to be true. The granules produced by the process of the present invention are stable, showing little tendency to pick up moisture. The granular product comprised of these agglomerates is white, free flowing, and remains so even after standing in a relatively humid atmosphere. This is in contrast with products generally obtained from spray drying techniques which, under the same conditions, have a tendency to absorb moisture and cake. It is also found quite unexpectedly, that the agglomerated particles of our invention are relatively resistant to breakage and attrition, behaving as though protected by an outer skin. This again is in contrast to the particles obtained by most spray drying techniques, which are fragile, and exhibit a relatively high rate of attrition.

The process of this invention will produce a white, free-flowing, water-soluble, stable product, the particles of which have an agglomerate configuration, the desired moisture content (degree of hydration), particle size and bulk density. Operating conditions may be varied in accordance with the present invention to obtain the desired result. The degree of moisture in the final product may be increased, for example, by decreasing the temperature of the bed which may in turn be reduced by lowering the temperature of the incoming fluidizing air or gas, or by decreasing the rate of flow of fluidizing gas through the bed, with care to provide enough gas to maintain proper fluidization. The amount of moisture may also be controlled by lowering the concentration of the aqueous feed solution, which will also lower the temperature of the bed and increase its moisture content. Increasing the humidity of the bed by utilizing humidified gas, or by injecting water, water vapor or steam into the fluidizing gas stream, or by recirculating at least part of the fluidizing gas stream, results in an increase in the moisture content of the final product.

If the fluidizing air were to be completely recirculated, the moisture content would quickly build up beyond practical limits, but such a recycle technique can be adopted provided the moisture content is controlled by removing the excess by condensation or other drying techniques.

A very important control factor is retention time, since the longer the particle remains in the fluid bed, the larger it tends to grow. Retention time can be increased to provide a corresponding increase in average particle size within the bed, by increasing the rate of recycle of fines from the fines-collector, and crushed outsized particles which are removed from the bed, comminuted and returned.

A fine adjustment of recycle rate, assuming that substantially all of the fines and crushed outsized particles are recycled, is had by recycling varying amounts of the product take-off. Generally speaking, all recycled solids to the fluid bed should consist of particles less than about 0.30 mm. in diameter (about 48 screen size). If, for example, a predominantly fine grade of product is required (90% between 60 and 325 mesh, Tyler Sieve size), the retention time should be made relatively short, whereas if a coarse grade is required (20-100 mesh), the retention time should be increased. In actual practice, the product generally consists of particles, 90% of which range between 20 and 325 mesh, so that two or more grades of product may be obtained from the material withdrawn, by classification methods such as screening, the point being that the predominance of either the coarse or fine grade of product can be shifted by controlling the residence time within the fluid bed.

The process of this invention offers the advantage that a wide particle size distribution is obtained so that more than one grade of product can be obtained.

To summarize, a novel product is obtained comprising granular particles of hydrous sodium silicate consisting of agglomerations of finer particles joined together. These granules of agglomerated particles have a greater surface area than spherical particles of equivalent volume. The product has a $Na_2O/SiO_2$ ratio within the range of 1:1 to 1:3.2 and contains water of hydration ranging from 10 to 20% by weight, preferably, within the range of 14 to 19%. A composition substantially as represented by the formula: $Na_2O.2.4SiO_2.2H_2O$ is especially preferred. The particles have a screen size substantially between 20 and 325 mesh. This material may, by classification methods, be divided into two or more products. For example, by screening, a "fine" grade may be separated having a particle size such that better than 90% passes a 60 mesh screen and is retained on a 325 mesh; and similarly, a "coarse" grade having a particle size such that better than 90% passes a 20 mesh screen and is retained on a 100 mesh screen (Tyler Standard).

The loose bulk density is at least 18 lbs./ft.$^3$, generally ranging from 18 to 26 lbs./ft.$^3$ for the "coarse" grade identified above, and 30 to 45 lbs./ft.$^3$ for the "fine" grade.

The process of the present invention may be better understood by reference to the accompanying flow sheet digrammatically presenting one way in which the process of the present invention may be carried out.

BRIEF DESCRIPTION OF THE DRAWING

Referring to the drawing:

Reference No. 1 represents a bed of granular particles fluidized by gas (air) which enters the system at point 2, and is preheated by heater 3, said heater being supplied by fuel (natural gas) entering at point 4. The heated air passes to "wind box" 5 beneath porous or perforate plate 6 and thence through the plate, passing upwardly, thus fluiding bed 1 in fluid bed dryer 7.

Reference 8 represents a feed tank containing a solution of sodium silicate which is heated by heater or heat exchange 9 and transported by pump 10 to spray nozzle 12 where it is dispersed into fluidizing zone 7 by means of compressed gas (air), entering at 13. A portion of the bed 1 is withdrawn as product at 14 and sent to classifier (screens) 15. All or a portion of the classified material is removed as product at 16. Outsized particles are sent through 17 to crusher 18. The crushed sodium silicate leaving the crusher is screened at 20 and any particles remaining on a 40-60 mesh screen are recycled to the crusher. The screen particles are generally recycled to the fluid bed through feeder 22 as a means of controlling the retention time, and accordingly the moisture content and particle size of the final product. This recycling technique also contributes to continuous stable operation.

A portion of the crushed screened material may, if desired, be taken directly as product and/or diverted to product classifier 15.

The off-gases pass through fines-collector (cyclone) 23 and may then be vented through line 24. If desired to achieve fuel economy, and as a means of adjusting the moisture content of the fluidizing gas, a portion of the off-gas (or all of it if the moisture content therein is controlled) may be recycled as fluidizing gas. Such a procedure will aid in the maintenance of a bed with uniform moisture content and permit very smooth, even operation. The fines collected at cyclone collector 23 are also recycled through feeder 22 to the fluid bed.

Gas having a controlled moisture content can be introduced into the system as the fluidizing gas. Water, water-vapor or steam can be introduced with the fluidizing gas, or directly into the fluid bed zone. The moisture content within the dryer can be controlled by adjusting the strength of the aqueous feed solution. It is recommended that samples be occasionally withdrawn from the bed and checked for moisture content as an aid in maintaining a bed having a uniform moisture content within the preferred range of 14 to 19% $H_2O$ and to permit smooth, stable operation.

EXAMPLE I

Granular sodium silicate is used as a starting bed, containing approximately 16% moisture and having a loose bulk density of 22.5 lbs./ft.$^3$. The $Na_2O/SiO_2$ ratio of this material is 1:2.0, thus containing approximately 28% $Na_2O$ and 56% $SiO_2$ by weight. Approximately 40 lbs. of material are charged to the fluid bed and 130 s.c.f.m./ft.$^2$ of air, containing approximately .001 lb. of water/ft.$^3$, is used to fluidize the bed. The temperature of the bed is slowly raised to about 275° F., using an air inlet temperature of 550° F. To maintain this temperature differential of 275° F. between inlet and bed, solution feed rates of 130–150 lbs./hr. are required. The feed solution ($Na_2O/SiO_2$=1:1.95–1:2.05) is heated to 200° F. and dispersed onto the bed with an air atomizing spray nozzle, using air pressure of 50 p.s.i.g. The silicate feed solution contains 50.6% solids made up of 16.9% $Na_2O$, 33.7% $SiO_2$, and 49.4% $H_2O$ with a temperature at the spray nozzle of 200° F. A liquid feed rate of 150 lbs./hr. is equivalent to approximately 75 lbs./hr. of dry solid feed. Bed particles are continuously discharged at the plate level. This material on screening is found to contain 3% larger than 4 mesh, 32% between 4 and 14 mesh, 40% between 14 and 65 mesh, and 20% less than 65 mesh. All of the particles larger than 14 mesh are crushed in the roller mill to less than 48 mesh and recycled to the fluid bed together with a fraction of the material above 65 mesh. The recycle rate is varied continuously throughout the operation but averages 360 lbs./hr., representing a ratio of about 5.5 times the rate of dry solids fed into the system. In addition, about 200 lbs./hr. of fines are collected from the cyclone and recycled to the fluid bed. About 84 lbs./hr. of hydrous granular sodium silicate is obtained as product, better than 90% of which falls between 20 and 325 mesh. By screening this material the product is separated into two grades of about equal weight. The "fine" grade comprises material, better than 90% of which lies between 60 and 375 mesh and the "coarse" grade, 90% of which falls between 20 and 100 mesh. As previously mentioned, the particle size can be shifted to predominantly coarse or predominantly fine by increasing or decreasing the retention times respectively. The loose bulk density of the fine grade is 38.7 lbs./ft.$^3$, whereas the density of the coarse grade is 24.7 lbs./ft.$^3$. Losses are nominal and vary with the efficiency of the cyclone separator. The length of this run is 4 hours.

In general, our fluid bed technique allows for easy control of the process unit and enables the use of a broad range of process conditions under which acceptable products can be made. In spray drying, the range of process conditions is limited and control is very sensitive.

Capital and space requirements are generally less for the fluid bed dryer as compared to the spray dryer. An economic advantage of our fluid bed technique over spray drying methods is that it offers a saving in fuel. First, recycle material need not be dissolved and then re-evaporated. Second, a longer particle residence time allows for better utilization of heat and for increased efficiency. Third, the desired product may be produced using sodium silicate solutions, containing in excess of 40% by weight sodium silicate solids, preferably from about 45% to 55% sodium silicate solids, whereas spray drying generally operates best with feed solutions having concentrations of 40% or less. The process of our invention therefore involves less evaporation in the drying step, thus less heat is required.

The product produced by means of this fluid bed process has numerous advantages over the spray dried counterpart. An unexpected advance in our technique is the great freedom to produce a wide range of density versus moisture content products. This is not the case for spray dried material. In fluid bed drying the product moisture may range from 10 to 20%, yet exhibit a loose bulk density greater than 35 lbs./ft.$^3$. Furthermore, the produced by fluid bed processing is stable and does not have a tendency to absorb moisture and consequently to cake. Product produced by spray draying techniques tends to absorb moisture from the atmosphere and equilibrate towards the trihydrate. This leads to caking.

The fluid bed processed sodium silicate is free-flowing, non-caking, stable and rapid dissolving. It may be produced in a wide variety of water contents that do not tend to absorb more moisture. Manufacturing is easily controlled producing a high density product conductive to economical shipping and handling, yet with moisture low enough to prevent caking. The economic penalties of shipping a product having a high water content are avoided.

By employing the process of the present invention, it can be seen that a hydrous granular sodium silicate can be prepared having particular application to detergent formulations by an economical one-step process. By screening or by other means of classification, two or more grades of hydrous granular sodium silicate can be prepared, each having special application. These free-flowing-white, readily soluble products can readily be blended into soap and detergent formulations.

Although certain preferred embodiments of the invention have been disclosed for purposes of illustration, it will be evident that various changes and modifications may be made therein without departing from the scope and spirit of the invention.

We claim:

1. A process for the production of granular hydrous sodium silicate comprising: maintaining a fluidized bed of sodium silicate particles, having an $Na_2O/SiO_2$ molar ratio lying between 1:1 and 1:3.2; passing a gas upwardly through the bed to maintain the particles in a fluid state; maintaining the temperature of the bed between 150 to 450° F.; introducing an aqueous feed solution of sodium silicate, having substantially the same $Na_2O/SiO_2$ ratio as that of the bed, into the fluidizing zone; maintaining the moisture content of the sodium silicate particles within the range of 10 to 20% by removing moisture with the gas passing through the bed; and discharging solid granular hydrous sodium silicate from the bed having a moisture content within the range of 10 to 20%.

2. The process of claim 1 wherein the bed comprises hydrous sodium silicate wherein the $Na_2O/SiO_2$ ratio ranges from 1:1.8 to 1:2.8, and the water content ranges from 14 to 19% by weight.

3. The process of claim 1 wherein the gas passing upwardly through the bed is air which fluidizes the bed and is preheated sufficiently to maintain the bed at a temperature within the range of 240 to 300° F.

4. The process of claim 1 wherein the aqueous feed solution has a concentration of at least 25%, and is dispersed into the fluidizing zone under pressure.

5. The process of claim 1 wherein the aqueous feed solution has a concentration of at least 25% and is dispersed into the fluidizing zone by means of compressed air.

6. The process of claim 1 wherein the aquous feed solution is preheated within the range of 100 to 300° F.

7. The process of claim 1 wherein the aqueous feed solution is preheated within the range of 150 to 225° F.

8. The process of claim 3 in which moisture is introduced into the fluidizing air.

9. The process of claim 3 in which a portion of the fluidizing air is recycled.

10. The process of claim 3 wherein the fluidizing air leaving the bed passes through a fines collecting device, wherein at least a portion of the sodium silicate entrained with the air is separated and recycled to the fluid bed.

11. The process of claim 1 wherein a portion of the bed is withdrawn and at least part of the portion withdrawn is classified as product.

12. The process of claim 1 wherein at least a part of the portion withdrawn is recycled to the fluid bed.

13. The process of claim 1 wherein at least a portion of the bed is withdrawn, classified, and particles larger than those desired as product are comminuted and recycled to the bed.

14. The process of claim 1 wherein a portion of the bed is withdrawn and classified by screening means to give a final product, at least 90% of which comprises particles ranging in size from 20 to 325 mesh.

15. A process for the production of granular hydrous sodium silicate comprising the steps of:
  (a) maintaining a fluidized bed of granular sodium silicate particles having an $Na_2O/SiO_2$ molar ratio lying between 1:1.8 and 1:2.8 and a moisture content falling within the range of 14 to 19%;
  (b) passing a stream of preheated air through the bed of granular sodium silicate to maintain the particles in a fluid state within a temperature range of 240 to 300° F.;
  (c) introducing a preheated aqueous solution of sodium silicate having an $Na_2O/SiO_2$ ratio substantially equivalent to that of the bed, a concentration within the range of 45 to 55%, and a temperature within the range of 150–225° F., whereby water is carried off as vapor by the fluidizing air rising through the bed;
  (d) discharging solid granular hydrous sodium silicate from the bed having a moisture content within the range of 10 to 20%;
  (e) classifying the particles of the discharged solids thereby obtaining a granular hydrous sodium silicate as product;
  (f) collecting solid fines entrained by the exiting fluidizing air;
  (g) recycling the discharged solids not taken as product, and the solid fines collected, to the fluid bed.

References Cited

UNITED STATES PATENTS

| | | | |
|---|---|---|---|
| 2,941,947 | 6/1960 | Schauer | 23—313 |
| 3,340,018 | 9/1967 | Otrhalek | 23—313 |
| 3,579,299 | 5/1971 | Sams | 23—110 A |
| 2,860,034 | 11/1958 | Mockrin | 252—135 |
| 3,377,134 | 4/1968 | Baker | 23—302 |

FOREIGN PATENTS

| | | | |
|---|---|---|---|
| 1,045,682 | 10/1966 | Great Britain | 23—110 A |
| 908,803 | 10/1962 | Great Britain | 23—313 |

OTHER REFERENCES

Chemical Abstracts, 1964, vol. 61, p. 7239–C.
Chemical Abstracts, 1970, vol. 72, p. 96 (102, 187v).
Chemical Abstracts, 1962, vol. 57, p. 1875f–i.

NORMAN YUDKOFF, Primary Examiner

S. J. EMERY, Assistant Examiner

U.S. Cl. X.R.

23—302, 301; 423—332; 264—117; 252—135; 159—48